Aug. 11, 1925.
F. PUNGA
ALTERNATING CURRENT MOTOR
Filed Aug. 16, 1920    2 Sheets-Sheet 1
1,549,684
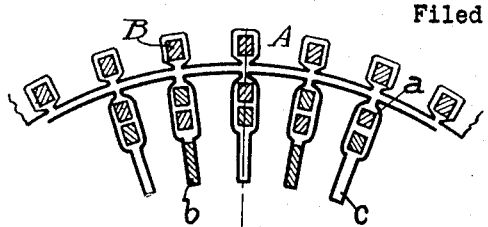
Fig.1.
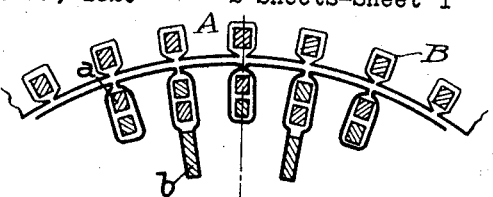
Fig.2.
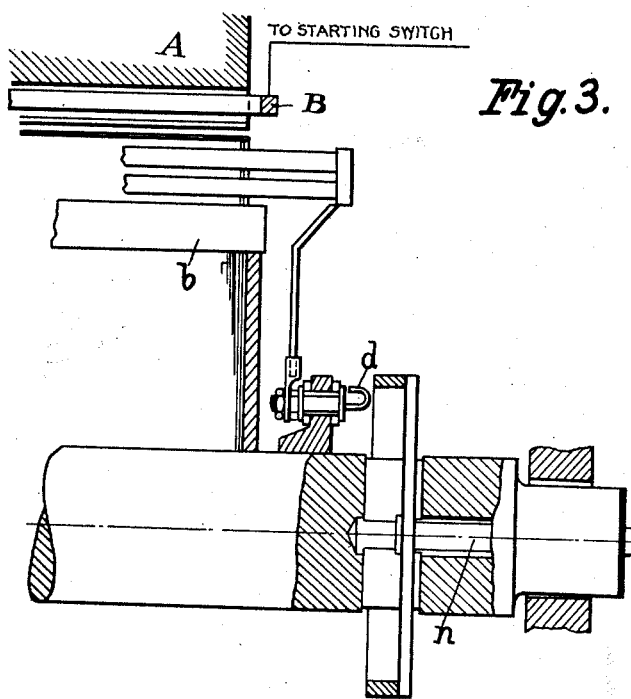
Fig.3.
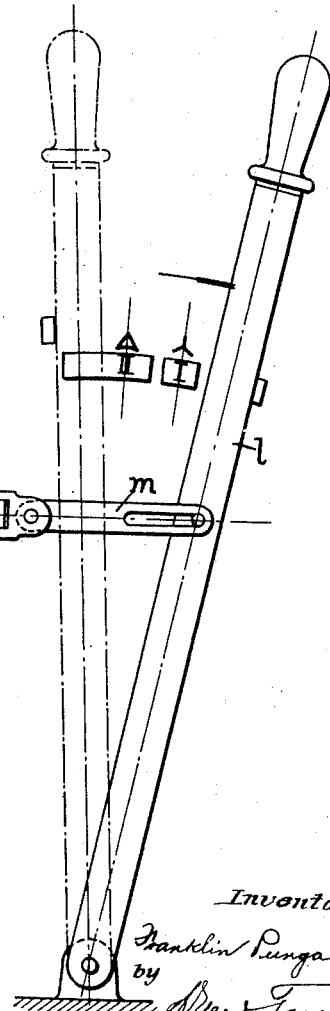
Inventor
Franklin Punga
by
Attorneys Aug. 11, 1925.  
F. PUNGA  
1,549,684  
ALTERNATING CURRENT MOTOR  
Filed Aug. 16, 1920  2 Sheets-Sheet 2

Patented Aug. 11, 1925.

1,549,684

UNITED STATES PATENT OFFICE.

FRANKLIN PUNGA, OF MULHEIM-RUHR-SPELDORF, GERMANY.

ALTERNATING-CURRENT MOTOR.

Application filed August 16, 1920. Serial No. 404,033.

(GRANTED UNDER THE PROVISIONS OF THE ACT OF MARCH 3, 1921, 41 STAT. L., 1313.)

*To all whom it may concern:*

Be it known that FRANKLIN PUNGA, a citizen of Germany, residing at No. 466 Duisburgerstr., Mulheim-Ruhr-Speldorf, Germany, has invented certain new and useful Improvements in Alternating-Current Motors (for which I have filed applications in England, April 10, 1920, No. 10,062; Germany, March 26, 1919, No. P 37,582; Germany, May 5, 1920; Spain, March 25, 1920; Holland, April 7, 1920, No. 14,460; France, April 10, 1920, No. 125,493; Belgium, April 13, 1920, No. 229,012, and Poland, April 6, 1920, No. 5,094), of which the following is a specification, reference being had therein to the accompanying drawing.

The subject of the invention is an alternating current motor for single or multi-phase current, in which, for the purpose of avoiding slip rings and starter, two different windings are provided in the rotor, one a winding which remains constantly short circuited and is provided with relatively high ohmic resistance (starting winding), and a second winding with relatively low ohmic resistance, which is short circuited by a special switching device only after starting (running winding). In previously known motors, the generation of a high self inductance in the rotor has been found to be necessary for the purpose of decreasing the shock of the current on switching in.

According to the present invention, this self inductance is generated by increasing the doubly interlinked or zigzag leakage (see Abhandlung von Rogowski und Simons in the "Elektrotechnische Zeitschrift" 1908, pages 535 and 564, and Abhandlungen von Punga in the "Archiv für Elektrotechnik," Vol. VII, Numbers 11 and 12), whereas in the known constructions this self inductance is obtained by increasing the singly inter-linked or slot leakage. The increase of the doubly inter-linked leakage is obtained, by making a considerably larger number of the rotor slots available for normal running than for starting the motor, having regard thereto that the magnitude of the doubly inter-linked leakage depends upon the number of slots. This variation in the number of slots for normal running and for starting is preferably obtained by arranging the starting winding in a fewer number of rotor slots than those occupied by running windings.

Obviously an equivalent of the essence of this arrangement of the starting winding, would be an arrangement in which although there are portions of the starting winding located in all the slots, however in some are only very small portions (for instance a small number of coils), whereas the major portions (for instance a large number of coils) are in the others.

An example of carrying out the invention is shown diagrammatically in the accompanying drawing, in which:—

Fig. 1 is a diagrammatic sectional view of a motor embodying the invention.

Fig. 2 is a similar view of a modification.

Fig. 3 shows the windings in connection with a special switching contrivance.

Figure 4:
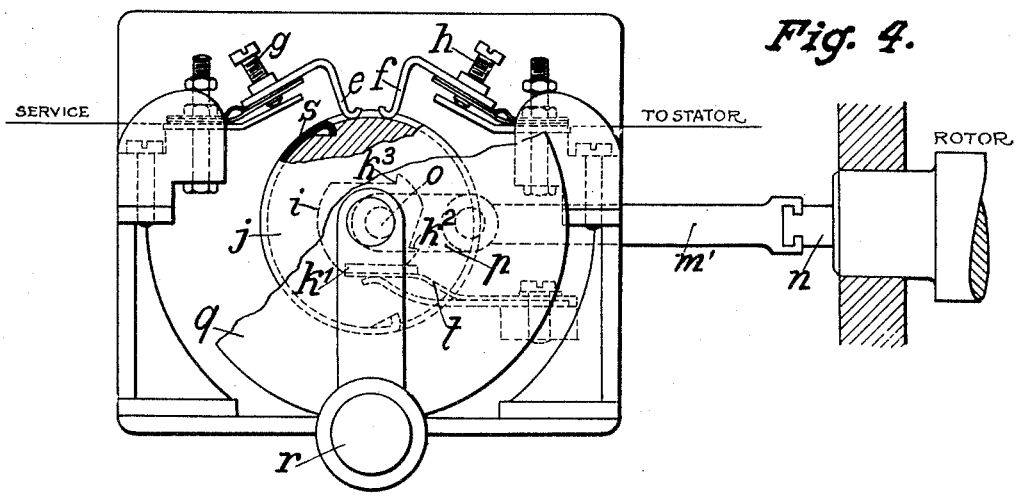
Fig. 4 is a front elevation, partly in section of a modified form of switch, the same being shown in the open position.

The winding $a$ is the running winding, which is to become operative only after starting and is short-circuited by any desired means. In Fig. 3 of the drawings is shown a well known short-circuiting device $d$ for this purpose. For the starting winding, a cage armature with bars $b$ is shown for example, which has been designed for relatively large slip at normal load. The bars $b$, as shown in Figs. 1 and 2, are less in number than the bars $a$. As shown there is a bar $b$ in each alternate slot in Fig. 1, while in Fig. 2 each alternate slot is deep enough to accommodate a winding $a$ only while each other slot is of a depth sufficient to accommodate a winding $a$ and a bar $b$. Preferably the winding $a$ is in proximity to the air gap, and the winding $b$ nearer the axis of the rotor, in order that the leakage produced by the winding $a$ (that is, the leakage during running) will be as small as possible, and the leakage produced by the winding $b$ (that is, the leakage during starting) be as great as possible.

The rotor slots can be either all uniformly formed, as shown in Fig. 1, and the portions $c$ of the slots, which do not carry bars $b$, can be used for ventilation, or, when such ventilation is not required additional slots for the starting winding can at intervals be formed simultaneously as shown in Fig. 2.

The form of slots shown in Fig. 2, gives, in addition to the increase of the doubly inter-linked leakage, a further advantage. The concentration of the bars of the starting winding in a smaller number of slots effects a considerable increase in the eddy current loss in the winding $a$ on starting, a phenomenon which can be advantageously utilized for starting, for the reason that the resistance of the rotor winding becomes smaller in proportion as the speed of revolution approaches synchronism.

The bars $b$ rest tightly in the slots preferably without insulating, so that the heat generated can be easily given up to the iron body of the rotor. The connection of the bars to the end rings is preferably effected by welding, whereby the danger of disconnection when running will be practically eliminated. It is preferable to utilize the clamping discs of the rotor as the end rings, whereby the construction may be cheapened. With the use of iron clamping discs and iron bars the skin effect of such discs can be utilized to advantage.

Instead of arranging the running and starting windings in slots in common, as shown in Fig. 1, they can also be arranged in different slots adjacent to one another as shown in Fig. 2, for example. In the latter case the starting winding will remain active even during running which in the arrangement shown in Fig. 1 is the case to a minor degree only.

The rotor, in the embodiment of the invention illustrated, is mounted concentrically within a stator A having a winding or windings B, as is common.

In Fig. 3 is illustrated a simple form of device for switching the rotor. When the lever 7, is in the full line position the rotor is cut out. When in the dotted line position the short circuiting device $d$ is closed by means of the link $m$ and rotating rod $n$. Current may be admitted to the stator A by means of any desired switching device.

Figure 5:
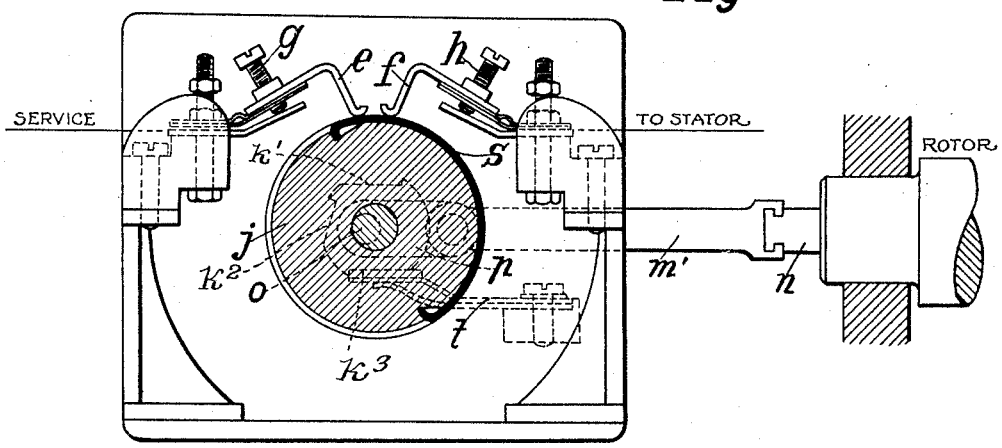
Fig. 5 is a transverse section thereof, showing the parts in position with both windings connected up.
Figure 6:
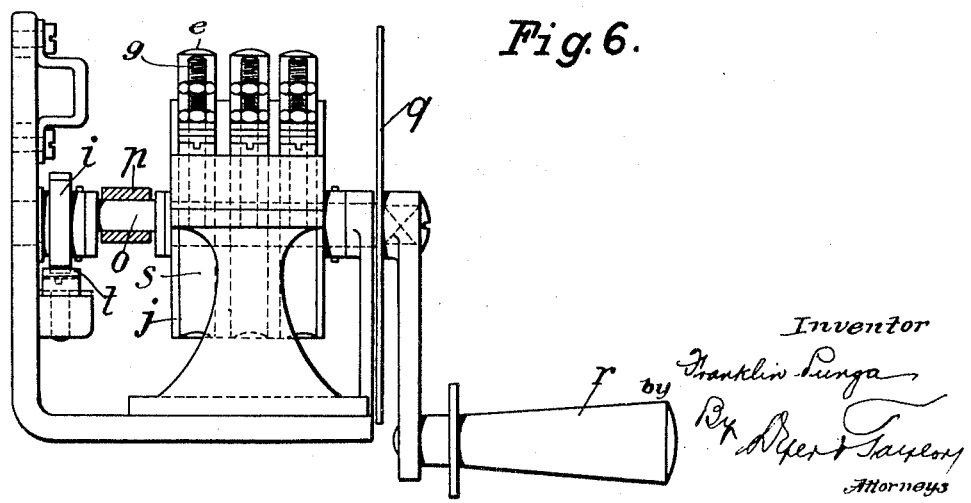
Fig. 6 is a side elevation of the same.

The advantage of the form of switch shown in Figs. 4, 5 and 6 is that the running winding cannot be switched in until after the stator winding has been switched in, and on the other hand the short circuiting of the running winding is positively dependent on and follows the switching out of the stator winding. The necessity of switching in the running winding after the switching in of the stator winding has been accomplished is due to the nature of the above described alternating current motor. The said constrained sequence on switching out is of importance, in order to avoid the formation of fused beads on the contact of the short-circuiting switch. The switch shown in the modification is accordingly so arranged, that between the switching in of the stator winding and the switching in of the running winding a lapse of time occurs, during which the motor approximately picks up full speed, whereby the switching in of the running winding is rapidly effected.

In the modification shown in Figs. 4, 5 and 6, the said constrained sequence of the switching operations is effected by one complete revolution of a switch drum, the direction of rotation of which is irreversible.

On a switch drum $j$, which is rotated by a crank $r$ provided with an indicator disc $q$, are provided contact strips $s$, which interconnect spring contacts $e$ and $f$ of the service terminals $g$ and the stator terminals $h$, when in a suitable angular position, for instance that of Fig. 5. An arm $p$, pivotally connected to the link $m^1$ of the short-circuiting device $n$, $d$ (Fig. 3) of the running winding, is mounted on the spindle of the switch drum by means of a crank or eccentric $o$ in the spindle. On the spindle of the switch drum $j$ is also secured a detent disc $i$ having three detent notches $k^1$, $k^2$ and $k^3$, in which successively engages a detent spring $t$. In the open position shown in Fig. 4, the detent spring engages in the notch $k^1$, when the contacts $e$ and $f$ and the short-circuiting device $n$, $d$ are out. On turning the crank $r$ from the notch $k^1$ to the notch $k^2$, the stator winding is switched in by interconnection of the contacts $e$ and $f$ by means of the contact strip $s$, whilst the short-circuiting device does not yet become operative. The necessary stroke of the crank or eccentric $o$ for switching in the short-circuiting device, occurs only on transit from the notch $k^2$ to the notch $k^3$. The notch $k^3$ serves therefore for the running position. Switching out results by further cranking through 180° from the notch $k^3$ to the notch $k^1$, at the beginning of which the stator winding is switched out by break of contact at the contacts $e$ and $f$, whilst only during the ensuing course of the rotation, the switching out of the short-circuit winding is effected by the crank or eccentric $o$.

I desire to have it understood that my invention may be carried out in connection with single or multiphase alternating current or induction motors.

I claim:

1. An alternating current motor, comprising a rotor having winding slots therein, there being a running winding in each of said slots, and there being a starting winding in a less number of said slots.

2. An alternating current motor, comprising a rotor having winding slots therein, there being a running winding in each of said slots, and there being a starting winding in a less number of said slots, said starting winding being in proximity to the running winding in its slot.

3. An alternating current motor, comprising a rotor and a stator, said stator having a winding, separate starting and running windings carried by the rotor in separate concentric circular series, each rotor winding comprising a plurality of bars, the angular distance between the running winding bars being less than the angular distance between the starting winding bars, the starting winding being permanently short circuited, means for short circuiting the running winding after starting the motor, means for switching in the windings, the means for switching in the running winding following the prior switching in of the stator winding, and the switching out of the running winding following the prior switching out of the stator winding.

4. An alternating current motor, comprising a rotor of squirrel-cage formation, a plurality of equally spaced winding bars arranged longitudinally of the rotor and forming the periphery thereof, a plurality of windings arranged parallel to the first mentioned bars and in circular arrangement between the first mentioned bars and the axis of the rotor, each of said second mentioned bars being in proximity to an alternate one of said first mentioned bars.

In testimony I have affixed my signature.

FRANKLIN PUNGA.